(12) United States Patent
Guo et al.

(10) Patent No.: US 9,486,844 B2
(45) Date of Patent: Nov. 8, 2016

(54) METHOD AND DEVICE FOR TREATMENT OF SALINE-ALKALI LAND

(71) Applicant: BEIJING NANO HI-TECH MATERIAL CO., LTD., Beijing (CN)

(72) Inventors: Zhijiang Guo, Beijing (CN); Yang Yu, Beijing (CN); Hongwei Chen, Beijing (CN); Gong Jin, Beijing (CN); Jiangping Tu, Beijing (CN); Xiuli Wang, Beijing (CN)

(73) Assignee: Beijing Nano Hi-Tech Material Co., Ltd., Beijing (CN)

( * ) Notice: Subject to any disclaimer, the term of this patent is extended or adjusted under 35 U.S.C. 154(b) by 48 days.

(21) Appl. No.: 14/533,875

(22) Filed: Nov. 5, 2014

(65) Prior Publication Data
US 2015/0056021 A1    Feb. 26, 2015

Related U.S. Application Data

(63) Continuation of application No. PCT/CN2012/080377, filed on Aug. 20, 2012.

(30) Foreign Application Priority Data

May 15, 2012    (CN) .......................... 2012 1 0151129

(51) Int. Cl.
     *B09C 1/02*      (2006.01)
     *B09C 1/00*      (2006.01)
     *B09C 1/08*      (2006.01)

(52) U.S. Cl.
CPC ................ *B09C 1/02* (2013.01); *B09C 1/002* (2013.01); *B09C 1/08* (2013.01); *B09C 1/085* (2013.01)

(58) Field of Classification Search
CPC ........... B09C 1/002; B09C 1/02; B09C 1/08; B09C 1/085; B09C 1/062; C02F 1/467; C02F 1/461
See application file for complete search history.

(56) References Cited

U.S. PATENT DOCUMENTS 5,433,829 A * 7/1995 Pool ........................ B09C 1/085
                                                                        166/248
5,846,393 A * 12/1998 Clarke .................... B09C 1/005
                                                                        204/450

FOREIGN PATENT DOCUMENTS

| CN | 1073664 A | 6/1993 |
|---|---|---|
| CN | 101481281 A | 7/2009 |
| DE | 3010291 A | 10/1981 |
| SU | 914613 A1 | 3/1982 |
| WO | WO 2013/170555 A1 | 11/2013 |

OTHER PUBLICATIONS

PCT International Search Report dated Feb. 28, 2013, issued in corresponding International Application No. PCT/CN2012/080377 (8 pages).
Li, Qian et al., "Summary of Ningxia Saline Status and Improved Measures", *Journal of Anhui Agricultural Sciences*, Nov. 2007, vol. 35, No. 33, pp. 10808-10810, 10813.
Zhu, Hong et al., "Assessment of Vegetation Restoring and Artificial Interference in the Saline-Alkaline Soil", *Jilin Forestry Science and Technology*, Sep. 2007, vol. 36, No. 5, pp. 14-22.

* cited by examiner

*Primary Examiner* — John Kreck
*Assistant Examiner* — Carib Oquendo

(57) ABSTRACT

A method for treatment of saline-alkali land is provided, comprising at least one self-circulating process, the self-circulating process comprising: step 1, converting saline-alkali water deposited in the saline-alkali land into acidic water by an electrolysis system, whereby the salt content of the acidic water is lower than that of the saline-alkali water; and step 2, leaching the saline-alkali land with leaching water comprising the acidic water. A device for treatment of saline-alkali land according to the above-described method is also provided, comprising: an electrolysis system for converting saline-alkali water deposited in the saline-alkali land into acidic water, whereby the salt content of the acidic water is lower than that of the saline-alkali water; and a leaching system for leaching the saline-alkali land with leaching water comprising the acidic water.

13 Claims, 2 Drawing Sheets

---

Step 1, converting saline-alkali water deposited in saline-alkali land into acidic water by an electrolysis system, salt content of the acidic water being lower than that of the saline-alkali water Step 2, leaching the saline-alkali land with leaching water comprising the acidic water

| Step 1, converting saline-alkali water deposited in saline-alkali land into acidic water by an electrolysis system, salt content of the acidic water being lower than that of the saline-alkali water |

| Step 2, leaching the saline-alkali land with leaching water comprising the acidic water |

METHOD AND DEVICE FOR TREATMENT OF SALINE-ALKALI LAND

CROSS-REFERENCE TO RELATED APPLICATIONS

This application is a continuation of International Patent Application No. PCT/CN2012/080377, filed Aug. 20, 2012, which claims priority to Chinese Patent Application No. 201210151129.3, filed May 15, 2012, the contents of both of which are incorporated herein by reference.

BACKGROUND

The present invention relates to methods and devices for treatment of saline-alkali land, and in particular, methods and devices for treating saline-alkali land by a self-circulating process, without addition of chemicals or introduction of fresh water.

Salts in soil are essential nutrients for growth of crops, but growth of crops may be inhibited by salt stress when the salt content in soil exceeds 0.1%. A land where the salt content in the soil exceeds 0.1% and thus plant growth is inhibited is generally called saline-alkali land. Saline-alkali lands can be classified into mild saline-alkali land, medium saline-alkali land, and severe saline-alkali land. In general, the salt content in soil of mild saline-alkali land ranges from 0.1% to 0.3%, the salt content in soil of medium saline-alkali land ranges from 0.3% to 0.6%, and the salt content in soil of severe saline-alkali land is >0.6%.

Currently, methods for treatment of saline-alkali land mainly include physical amelioration, chemical amelioration, biological amelioration, and water amelioration. These methods share the same problem that they do not extract salts from soil but merely change the rule of salt migration. Therefore, these methods may have poor treatment effect, require repeated treatments, long treatment periods, and large investment, and consume a large amount of water resource. Pat. Pub. No. CN1236537A discloses a method for physically ameliorating saline-alkali land, in which the salt content of saline-alkali land is reduced by deep ploughing, irrigating and draining, and leaching with fresh water. The method is simple in operation, but has poor ameliorating effect and the problem of repeated increase of salt content. Pat. Pub. No. CN101134898A discloses a method for chemically ameliorating saline-alkali land, in which salts are isolated by a saline-alkali land improver to protect the root system of crops. Although the method can increase the survival rate of crops, the improver comprises complicated components and thus has a large influence on the ecological environment, and the method is costly because of the need of continuous investment. Pat. Pub. Nos. CN1559709A and No. CN192645A disclose a method for biologically ameliorating saline-alkali land, in which the salt content in soil is decreased by growing salt-tolerant plants that absorb salts. However, the salt-tolerant plants need long breeding periods and have poor regional adaptability. Pat. Pub. Nos. CN1765169A and CN1799301A disclose a method for ameliorating saline-alkali land by water conservancy, in which salt content in solid is decreased with concealed conduits or salt removing tanks as means for water conservancy. The method is costly and needs maintenance all the year round. All the above four amelioration methods are based on consumption of a large amount of fresh water. The water resources in the region where saline-alkali land is treated may comprise all saline-alkali water, and hence it may require introducing fresh water from other regions, thereby intensifying the contradiction of freshwater resource allocation in the country.

In addition, Pat. Pub. Nos. CN10189804A, CN2740595Y, and CN1073664A disclose a method for decreasing salt content in saline-alkali water with a centrifuge or an electronic treatment apparatus. By the method, salts in saline-alkali water can be extracted in a short time. However, very strict technical conditions must be satisfied when saline-alkali land is treated with these complicated and precise apparatus. As a result, desalination of saline-alkali water is costly, and it is difficult to realize large-scale treatments of saline-alkali land with a low cost. Moreover, the desalting apparatus need to be powered by supply of conventional electricity or motive force electricity, and thus the method is difficult to be applied to saline-alkali lands that are distributed broadly and scattered loosely.

SUMMARY

In order to solve at least one of the above-mentioned problems, the present invention provides methods for treatment of saline-alkali land, which can fundamentally decrease the salt content of saline-alkali land by a self-circulating process without addition of chemicals or introduction of external fresh water. The methods are suitable for industrially treating saline-alkali land in wild conditions at a large scale and low cost.

The present invention provides a method for treatment of saline-alkali land, comprising at least one self-circulating process, wherein the self-circulating process comprises:

step 1, converting saline-alkali water deposited in the saline-alkali land into acidic water by an electrolysis system, whereby the salt content of the acidic water is lower than that of the saline-alkali water; and step 2, leaching the saline-alkali land with leaching water comprising the acidic water.

In some embodiments, the leaching water may be the acidic water.

In some embodiments, in step 2, the acidic water may be mixed with the saline-alkali water deposited in the saline-alkali land to form the leaching water.

In some embodiments, the acidic water may have a pH value ranging from 2 to 4 and a salt content less than 2 g/L.

In some embodiments, the acidic water may be mixed with the saline-alkali water deposited in the saline-alkali land at a ratio ranging from 1:10 to 1:200.

In some embodiments, the electrolysis system may comprise an electrolyte comprising the saline-alkali water deposited in the saline-alkali land, and a plurality of inert polar plates immersed in the electrolyte side by side, wherein the inert polar plates are connected with negative and positive electrodes of a pulsed bias power supply, respectively, and applied with a pulsed bias current having a pulse frequency ranging from 1 KHz to 1000 KHZ, a pulse amplitude ranging from 8 V to 50 V, a bias voltage ranging from 2 V to 20 V, and a bias current density ranging from 0.5 mA/cm2 to 20 mA/cm2. In some embodiments, the inert polar plates may be spaced at 0.5 cm to 20 cm.

In some embodiments, the pulsed bias power supply may comprise a pulsed direct current bias power supply; the electrolysis system may comprise two inert polar plates spaced at 1 cm; the inert polar plates are connected to the positive and negative electrodes of the pulsed direct current bias power supply, respectively; the electrolysis system may further comprise a gas-treating tank comprising 1 mol/L sodium hydroxide and applied with a pulsed bias current having a pulse frequency of 2 KHz, a pulse amplitude of 15 V, a bias voltage of 4 V, and a bias current density of 3 mA/cm$^2$.

In some embodiments, the pulsed bias power supply may comprise a pulsed direct current bias power supply; the electrolysis system may comprise two inert polar plates spaced at 1 cm; the inert polar plates are connected to the positive and negative electrodes of the pulsed direct current bias power supply, respectively; the electrolysis system may further comprise a gas-treating tank comprising 1 mol/L sodium hydroxide and applied with a pulsed bias current having a square pulse frequency of 50 KHz, a pulse amplitude of 25 V, a bias voltage of 6 V, and a bias current density of 5 mA/cm$^2$.

In some embodiments, the pulsed bias power supply may comprise a pulsed alternating current bias power supply; the electrolysis system may comprise two inert polar plates spaced at 2 cm; the inert polar plates are connected to the electrodes of the pulsed alternating current bias power supply, respectively; the electrolysis system may further comprise a gas-treating tank comprising 1 mol/L sodium hydroxide and applied with a pulsed bias current having a square pulse frequency of 100 KHz, a pulse amplitude of 30 V, a bias voltage of 8 V, and a bias current density of 3 mA/cm$^2$.

In some embodiments, the inert polar plate may comprise a noble metal-based electrode, a plastic-based electrode, a graphite-based electrode, or a ceramic-based electrode.

The present invention further provides a device for treatment of saline-alkali land according to the above-described methods, comprising:

an electrolysis system for converting saline-alkali water deposited in the saline-alkali land into acidic water, whereby the salt content of the acidic water is lower than that of the saline-alkali water; and a leaching system for leaching the saline-alkali land with leaching water comprising the acidic water.

In some embodiments, the leaching water may be the acidic water.

In some embodiments, the leaching water may comprise a mixture of the acidic water and the saline-alkali water deposited in the saline-alkali land.

In some embodiments, the electrolysis system may comprise an electrolyte comprising the saline-alkali water deposited in the saline-alkali land, and a plurality of inert polar plates immersed in the electrolyte side by side, wherein the inert polar plates are connected with negative and positive electrodes of a pulsed bias power supply, respectively, and applied with a pulsed bias current having a pulse frequency ranging from 1 KHz to 1000 KHz, a pulse amplitude ranging from 8 V to 50 V, a bias voltage ranging from 2 V to 20 V, and a bias current density ranging from 0.5 mA/cm$^2$ to 20 mA/cm$^2$. In some embodiments, the inert polar plates may be spaced at 0.5 cm to 20 cm.

In some embodiments, the pulsed bias power supply may comprise a pulsed direct current bias power supply; the electrolysis system may comprise two inert polar plates spaced at 1 cm; the inert polar plates are connected to the positive and negative electrodes of the pulsed direct current bias power supply, respectively; the electrolysis system may further comprise a gas-treating tank comprising 1 mol/L sodium hydroxide and applied with a pulsed bias current having a pulse frequency of 2 KHz, a pulse amplitude of 15 V, a bias voltage of 4 V, and a bias current density of 3 mA/cm$^2$.

In some embodiments, the pulsed bias power supply may comprise a pulsed direct current bias power supply; the electrolysis system may comprise two inert polar plates spaced at 1 cm; the inert polar plates are connected to the positive and negative electrodes of the direct-current pulsed bias power supply, respectively; the electrolysis system may further comprise a gas-treating tank comprising 1 mol/L sodium hydroxide and applied with a pulsed bias current having a square pulse frequency of 50 KHz, a pulse amplitude of 25 V, a bias voltage of 6 V, and a bias current density of 5 mA/cm$^2$.

In some embodiments, the pulsed bias power supply may comprise a pulsed alternating current bias power supply; the electrolysis system may comprise two inert polar plates spaced at 2 cm; the inert polar plates are connected to the electrodes of the alternating-current pulsed bias power supply, respectively; the electrolysis system may further comprise a gas-treating tank comprising 1 mol/L sodium hydroxide and applied with a pulsed bias current having a square pulse frequency of 100 KHz, a pulse amplitude of 30 V, a bias voltage of 8 V, and a bias current density of 3 mA/cm$^2$.

In some embodiments, the inert polar plate may comprise a noble metal-based electrode, a plastic-based electrode, a graphite-based electrode, or a ceramic-based electrode.

By the methods and devices for treatment of saline-alkali land provided in the present invention, self-circulation of the ecological system in saline-alkali land can be driven by electrolysis without addition of chemicals or introduction of fresh water. Separation of salts from water and soil resources can be accomplished by controlling "salt-water" and "salt-soil" resource allocation between saline-alkali water and saline-alkali land, thereby enhancing usable freshwater resources, fundamentally decreasing the salt content of saline-alkali land, and industrially treating saline-alkali land in wild conditions at a large scale and low cost.

BRIEF DESCRIPTION OF DRAWING

The above-described and/or additional aspects and advantages of the present invention will become clear and easily-understandable in combination with the following description of the examples with reference to the drawing.

DETAILED DESCRIPTION

Figure 1:
FIG. 1 shows a flow diagram of a method for treatment of saline-alkali land according to one embodiment of the present invention.

The examples of the present invention are described below in detail. The examples are exemplified in the drawing, where the symbols that are same or similar throughout represent the same or similar elements or elements having the same or similar functions. The following example described with reference to the drawing is exemplary, merely serves as an illustration of the present invention, and cannot understood as limitation to the present invention.

FIG. 1 shows a flow diagram of a method for treatment of saline-alkali land according to one embodiment of the present invention. Referring to FIG. 1, the method for treatment of saline-alkali land according to one embodiment of the present invention comprises at least one self-circulating process, and the self-circulating process may comprise:

Step 1, converting saline-alkali water deposited in the saline-alkali land into acidic water by an electrolysis system, whereby the salt content of the acidic water is lower than that of the saline-alkali water; and Step 2, leaching the saline-alkali land with leaching water comprising the acidic water.

By the method disclosed herein, self-circulation of the ecological system in saline-alkali land can be driven by electrolysis without addition of chemicals or introduction of fresh water. Separation of salts from water and soil resources can be accomplished by controlling "salt-water" and "salt-soil" resource allocation between saline-alkali water and saline-alkali land, thereby enhancing usable freshwater resources, fundamentally decreasing the salt content of saline-alkali land and, industrially treating saline-alkali land in wild conditions at a large scale and low cost.

In one embodiment, firstly, saline-alkali water deposited in saline-alkali land may be converted into acidic water by an electrolysis system, and the salt content of the acidic water may be lower than that of the saline-alkali water. That is to say, electrolysis may be carried out with an electrolyte comprising the saline-alkali water deposited in saline-alkali land to convert the saline-alkali water to the acidic water with a decreased salt content. In some embodiments, the saline-alkali water may be exploited from driven wells in the saline-alkali land or may comprise water deposited in pits and the like in the saline-alkali land. After electrolysis, the saline-alkali water may have a decreased salt content and be acidic. In some embodiments, the acidic water may have a pH value ranging from 2 to 4 and a salt content less than 2 g/L.

Then, the saline-alkali land may be further leached with leaching water comprising the acidic water.

In some embodiments, components of the leaching water can be chosen according to the salinization degree of the saline-alkali land. For instance, when the saline-alkali land is a severe saline-alkali land and has salt accumulation on the surface, the acidic water can be used directly to leach the saline-alkali land so as to release salts in the severe saline-alkali land to the saline-alkali water and allow for the next self-circulation for desalination. When the saline-alkali land is a medium or mild saline-alkali land, or when saline-alkali tolerance of the vegetation on the saline-alkali land is taken into consideration, the acidic water may be mixed with saline-alkali water at a certain ratio to control salinity and alkalinity of the leaching water for leaching the saline-alkali land. According to the standard for medium and mild saline-alkali lands without salt accumulation in surface soil and the range of pH values to which the vegetation is adapted, the mixing ratio may range from 1:10 to 1:200, for example, from 1:40 to 1:80.

In some embodiments, the above two steps can be repeated for plural times to achieve better and fundamental decrease of the salt content of the saline-alkali land.

The above describes a method for treatment of saline-alkali land according to one embodiment of the present invention. For better understanding of the present invention, exemplary electrolysis systems are described below. Parameters of the electrolysis system and the mixing ratio of the leaching water can be chosen according to practical situations. In one embodiment, the electrolysis system may comprise an electrolyte comprising the saline-alkali water deposited in the saline-alkali land, and a plurality of inert polar plates immersed in the electrolyte side by side. The inert polar plates may be connected with negative and positive electrodes of a pulsed bias power supply, respectively, and applied with a pulsed bias current having a pulse frequency ranging from 1 KHz to 1000 KHz, a pulse amplitude ranging from 8 V to 50 V, a bias voltage ranging from 2 V to 20 V, and a bias current density ranging from 0.5 mA/cm$^2$ to 20 mA/cm$^2$. After electrolysis for a certain period, the saline-alkali water deposited in the saline-alkali land may be converted to acidic water with a salt content less than 2 g/L and a pH value ranging from 2 to 4. In some embodiments, the inert polar plate may comprise a noble metal-based electrode, a plastic-based electrode, a graphite-based electrode, or a ceramic-based electrode. In some embodiments, the pulsed bias power supply may comprise a pulsed direct current bias power supply or a pulsed alternating current bias power supply.

In a particular example, the electrolysis system comprises a pulsed direct current bias power supply connected to a wind-driven generator with a power supply capacity of 1 KWh, and two inert polar plates spaced t 1 cm. The inert polar plates are connected to the positive and negative electrodes of the pulsed direct current bias power supply, respectively, and immersed in the saline-alkali water (with a salt content of 9.46 g/L and a pH of 8.01, main components comprising sulfates and chlorides) deposited in the saline-alkali land at 5 villages, ANAKULE, KASHI river, Sinkiang province, China. The electrolysis system further comprises a gas-treating tank comprising 1 mol/L sodium hydroxide. A pulsed bias current having a pulse frequency of 2 KHz, a pulse amplitude of 15 V, a bias voltage of 4 V, and a bias current density of 3 mA/cm$^2$ is applied to the electrolysis system. The electrolysis period of the electrolysis system is 7 days. In the electrolysis process, 2.80 g of white precipitate, which is tested to be calcium sulfate, is collected after electrolysis for 24 h. After electrolysis for 48 h, the treated solution in the tank is taken out and tested to contain chloride ions in an amount of 0.98 g/L. 3.50 g of white precipitate is collected after electrolysis for 7 days. The treated solution collected at this time is tested to contain 3.43 g/L chloride ions. The saline-alkali water is converted by electrolysis to acidic water containing 1.2 g/L salts and having a pH value of 2.16. The acidic water is mixed with the saline-alkali water at a ratio of 1:50 to form leaching water. The saline-alkali land is leached with the leaching water. By repeated electrolysis and leaching steps, the salt content of the saline-alkali land is decreased to 0.24%, the pH value thereof is reduced to 6.94, and the severe saline-alkali land is ameliorated to mild saline-alkali land.

In another particular example, the electrolysis system comprises a pulsed direct current bias power supply connected to a 220 V conventional power supply, and two inert polar plates spaced at 1 cm. The inert polar plates are connected to the positive and negative electrodes of the pulsed direct current bias power supply, respectively, and immersed in the saline-alkali water (with a salt content of 18.73 g/L and a pH of 8.47, main components comprising sulfates and chlorides) deposited in the saline-alkali land in QINGTUHU district, MINQIN, Gansu province, China. The electrolysis system further comprises a gas-treating tank comprising 1 mol/L sodium hydroxide. A pulsed bias current having a square pulse frequency of 50 KHz, a pulse amplitude of 25 V, a bias voltage of 6 V, and a bias current density of 5 mA/cm$^2$ is applied to the electrolysis system. The electrolysis period of the electrolysis system is 10 days. In the electrolysis process, 9.33 g of white precipitate, which is tested to be calcium sulfate, is collected after electrolysis for 48 h. After electrolysis for 72 h, the treated solution in the tank is taken out and tested to contain chloride ions in an amount of 2.61 g/L. 10.50 g of white precipitate is collected after electrolysis for 10 days. The treated solution collected at this time is tested to contain 7.83 g/L chloride ions. The saline-alkali water is converted by electrolysis to acidic water containing 1.79 g/L salts and having a pH value of 2.73. The acidic water is mixed with saline-alkali water at a ratio of 1:40 to form leaching water. The saline-alkali land is leached with the leaching water. By repeated electrolysis and leaching steps, the salt content of the saline-alkali land is decreased to 0.37%, the pH value thereof is reduced to 6.81, and the severe saline-alkali land is ameliorated to medium saline-alkali land.

In yet another particular example, the electrolysis system comprises a pulsed alternating current bias power supply connected to a 220 V conventional power supply, and two inert polar plates spaced at 2 cm. The inert polar plates are connected to the electrodes of the pulsed alternating current bias power supply, respectively, and immersed in the saline-alkali water (with a salt content of 20.8 g/L and a pH of 7.35, main component comprising chlorides) deposited in the saline-alkali land in Tianjin DAGANG oilfield, China. The electrolysis system further comprises a gas-treating tank comprising 1 mol/L sodium hydroxide. A pulsed bias current having a square pulse frequency of 100 KHz, a pulse amplitude of 30 V, a bias voltage of 8 V, and a bias current density of 3 mA/cm$^2$ is applied to the electrolysis system. The electrolysis period of the electrolysis system is 15 days. In the electrolysis process, the treated solution in the tank is taken out after electrolysis for 72 h, and tested to contain 1.76 g/L chloride ions. After electrolysis for 15 days, the treated solution is tested to contain 11.65 g/L chloride ions. The saline-alkali water is converted by electrolysis to acidic water containing 1.60 g/L salts and having a pH value of 2.13. The acidic water is mixed with saline-alkali water at a ratio of 1:80 to form leaching water. The saline-alkali land is leached with the leaching water. By repeated electrolysis and leaching steps, the salt content of the saline-alkali land is decreased to 0.51%, the pH value thereof is reduced to 6.92, and the severe saline-alkali land is ameliorated to medium saline-alkali land.

Figure 2:
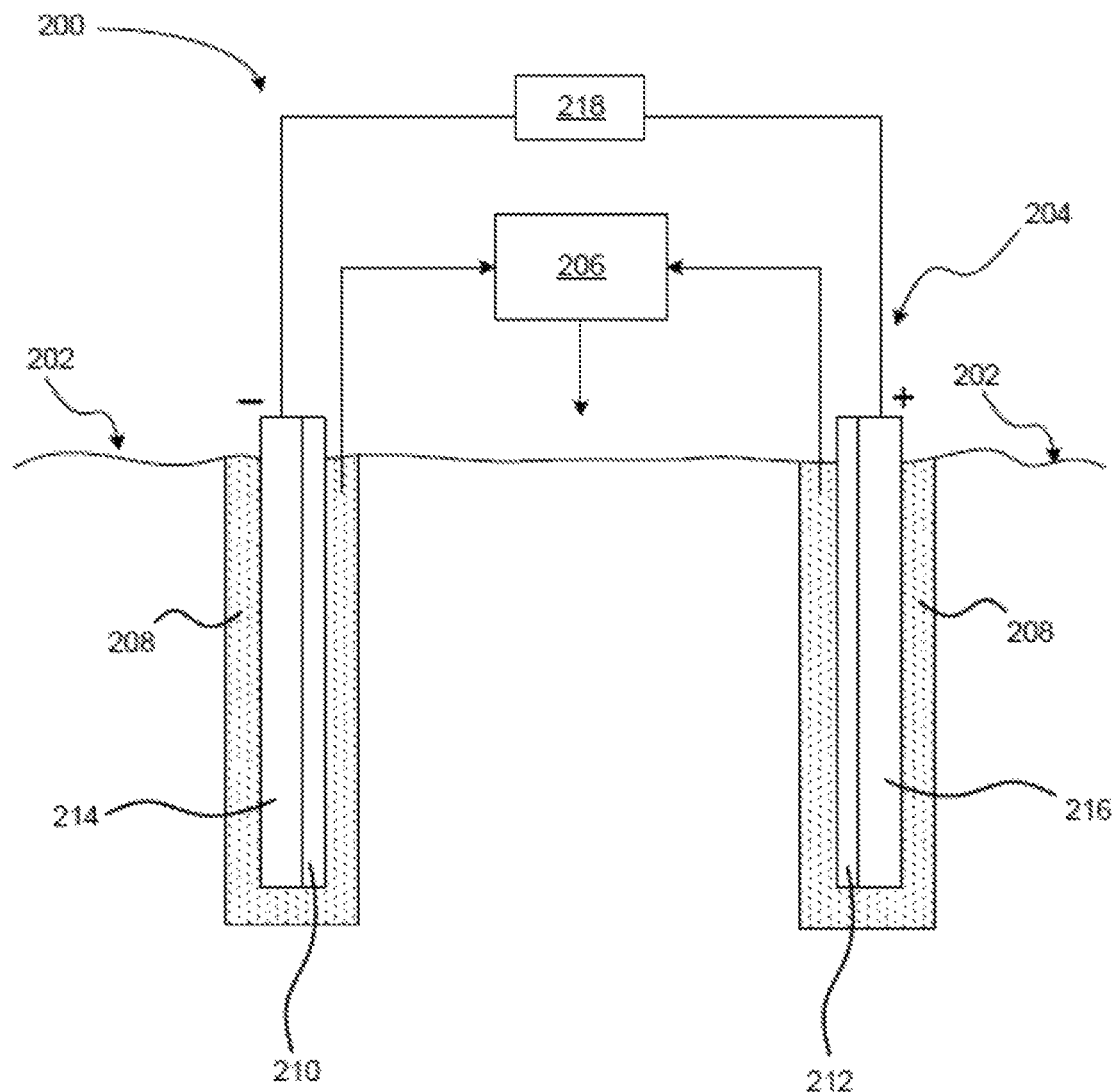
FIG. 2 shows a simplified schematic of a device for treatment of saline-alkali land according to one embodiment of the present invention.

The above contents describe methods for treatment of saline-alkali land according to some embodiments of the present invention. As shown in FIG. 2, the present invention further provides a device 200 for treating saline-alkali land 202 according to the above methods, comprising an electrolysis system 204 for converting saline-alkali water deposited in the saline-alkali land 202 into acidic water, whereby the salt content of the acidic water is lower than that of the saline-alkali water; and a leaching system 206 for leaching the saline-alkali land 202 with leaching water comprising the acidic water 208.

Parameters of the electrolysis system 204 may be chosen according to practical situations. In one embodiment, the electrolysis system 204 may comprise an electrolyte 208 comprising the saline-alkali water deposited in the saline-alkali land 202, and a plurality of inert polar plates 210, 212 immersed in the electrolyte 208 side by side. The inert polar plates 210, 212 may be connected with negative and positive electrodes 214 216 of a pulsed bias power supply 218, respectively, and applied with a pulsed bias current having a pulse frequency ranging from 1 KHz to 1000 KHz, a pulse amplitude ranging from 8 V to 50 V, a bias voltage ranging from 2 V to 20 V, and a bias current density ranging from 0.5 mA/cm$^2$ to 20 mA/cm$^2$. After electrolysis for a certain period, the saline-alkali water deposited in the saline-alkali land 202 may be converted to acidic water with a salt content less than 2 g/L and a pH value ranging from 2 to 4. In some embodiments, the inert polar plates 210, 212 may comprise a noble metal-based electrode, a plastic-based electrode, a graphite-based electrode, or a ceramic-based substrate. In some embodiments, the pulsed bias power supply 218 may comprise a pulsed direct current bias power supply or a pulsed alternating current bias power supply.

In some embodiments, components of the leaching water can be chosen according to the salinization degree of the saline-alkali land. For instance, when the saline-alkali land is a severe saline-alkali land and has salt accumulation on the surface, the acidic water can be used directly to leach the saline-alkali land so as to release salts in the severe saline-alkali land to the saline-alkali water and allow for the next self-circulation for desalination. When the saline-alkali land is a medium or mild saline-alkali land or saline-alkali tolerance of the vegetation on the saline-alkali land is taken into consideration, the acidic water may be mixed with saline-alkali water at a certain ratio to control salinity and alkalinity of the leaching water for leaching the saline-alkali land. According to the standard for medium and mild saline-alkali lands without salt accumulation in surface soil and the range of pH values to which the vegetation is adapted, the mixing ratio may range from 1:10 to 1:200, for example, from 1:40 to 1:80.

By the devices for treatment of saline-alkali land provided in the present invention, self-circulation of the ecological system in saline-alkali land can be driven by electrolysis without addition of chemicals or introduction of fresh water. Separation of salts from water and soil resources can be accomplished by controlling "salt-water" and "salt-soil" resource allocation between saline-alkali water and saline-alkali land, thereby enhancing usable fresh water resources, fundamentally decreasing the salt content of saline-alkali land and, industrially treating saline-alkali land in wild conditions at a large scale and low cost.

The above-described is merely preferred embodiments of the present invention. It should be indicated that, for a common skilled person in the art, several improvements and modifications may be further made in the case of no deviation from the principle of the present invention, and these improvements and modifications should be regarded as falling within the protection scope covered by the present invention.

What is claimed is:

1. A method for treatment of saline-alkali land, comprising at least one self-circulating process, wherein the self-circulating process comprises:
    step 1, converting saline-alkali water deposited in the saline-alkali land into acidic water by an electrolysis system, whereby the salt content of the acidic water is lower than that of the saline-alkali water; and
    step 2, leaching the saline-alkali land with leaching water comprising the acidic water,
    wherein the electrolysis system comprises an electrolyte comprising the saline-alkali water deposited in the saline-alkali land.

2. The method of claim 1, wherein the electrolysis system comprises a plurality of inert polar plates immersed in the electrolyte side by side and connected with negative and positive electrodes of a pulsed bias power supply, respectively.

3. The method of claim 2, wherein the inert polar plates are spaced at 0.5 cm to 20 cm, and applied with a pulsed bias current having a pulse frequency ranging from 1 KHz to 1000 KHz, a pulse amplitude ranging from 8 V to 50 V, a bias voltage ranging from 2 V to 20 V, and a bias current density ranging from 0.5 mA/cm$^2$ to 20 mA/cm$^2$.

4. The method of claim 3, wherein the pulsed bias power supply comprise a pulsed direct current bias power supply;
    wherein the electrolysis system comprises two inert polar plates spaced at 1 cm and connected to the positive and negative electrodes of the pulsed direct current bias power supply, respectively; and further wherein the electrolysis system comprises a gas-treating tank comprising 1mol/L sodium hydroxide and applied with a pulsed bias current having a pulse frequency of 2 KHz, a pulse amplitude of 15 V, a bias voltage of 4 V, and a bias current density of 3 mA/cm$^2$.

5. The method of claim 3, wherein the pulsed bias power supply comprises a pulsed direct current bias power supply;

wherein the electrolysis system comprises two inert polar plates spaced at 1 cm and connected to the positive and negative electrodes of the pulsed direct current bias power supply, respectively; and further wherein the electrolysis system comprises a gas-treating tank comprising 1 mol/L sodium hydroxide and applied with a pulsed bias current having a square pulse frequency of 50 KHz, a pulse amplitude of 25 V, a bias voltage of 6 V, and a bias current density of 5 mA/cm$^2$.

6. The method of claim 3, wherein the pulsed bias power supply comprises a pulsed alternating current bias power supply;

wherein the electrolysis system comprises two inert polar plates spaced at 2 cm and connected to the electrodes of the pulsed alternating current bias power supply, respectively; and further wherein the electrolysis system comprises a gas-treating tank comprising 1 mol/L sodium hydroxide and applied with a pulsed bias current having a square pulse frequency of 100 KHz, a pulse amplitude of 30 V, a bias voltage of 8 V, and a bias current density of 3 mA/cm$^2$.

7. The method of claim 1, wherein the leaching water is the acidic water.

8. The method of claim 1, wherein, in step 2, the acidic water is mixed with the saline-alkali water deposited in the saline-alkali land to form the leaching water.

9. The method of claim 8, wherein the acidic water is mixed with the saline-alkali water deposited in the saline-alkali land at a ratio ranging from 1:10 to 1:200.

10. The method of claim 9, wherein the acidic water is mixed with the saline-alkali water deposited in the saline-alkali land at a ratio ranging from 1:40 to 1:80.

11. The method of claim 1, wherein the acidic water has a pH value ranging from 2 to 4 and a salt content less than 2 g/L.

12. A method for treatment of saline-alkali land, comprising at least one self-circulating process, wherein the self-circulating process comprises:

converting saline-alkali water deposited in the saline-alkali land into acidic water by an electrolysis system, wherein a salt content of the acidic water is lower than a salt content of the saline-alkali water, wherein the acidic water has a pH value ranging from 2 to 4 and a salt content less than 2 g/L;

subsequently combining the acidic water with the saline-alkali water deposited in the saline-alkali land to form leaching water, wherein a ratio, in the leaching water, of the alkali water to the saline-alkali water deposited in the saline-alkali land is in a range from 1:40 to 1:80; and leaching the saline-alkali land with the leaching water.

13. The method of claim 12, wherein the electrolysis system comprises:

an electrolyte comprising the saline-alkali water deposited in the saline-alkali land; and at least a first polar plate connected to a negative electrode of a pulsed bias power supply, and at least a second polar plate connected to a positive electrode of the pulsed bias power supply, wherein the first and second polar plates are immersed in the electrolyte and spaced 0.5 cm to 20 cm apart, wherein a pulsed bias current is applied to the first and second polar plates, the pulsed bias current having a pulse frequency ranging from 1 KHz to 1000 KHz, a pulse amplitude ranging from 8 V to 50 V, a bias voltage ranging from 2 V to 20 V, and a bias current density ranging from 0.5 mA/cm$^2$ to 20 mA/cm$^2$.

* * * * *

UNITED STATES PATENT AND TRADEMARK OFFICE
CERTIFICATE OF CORRECTION

PATENT NO. : 9,486,844 B2
APPLICATION NO. : 14/533875
DATED : November 8, 2016
INVENTOR(S) : Zhijiang Guo et al.

It is certified that error appears in the above-identified patent and that said Letters Patent is hereby corrected as shown below:

In the Specification

Column 2, Line 57, please delete "mA/cm2" and insert --mA/cm$^2$--

Column 2, Line 58, please delete "mA/cm2" and insert --mA/cm$^2$--

Signed and Sealed this
Eighteenth Day of April, 2017

Michelle K. Lee
*Director of the United States Patent and Trademark Office*